US010001186B2

(12) United States Patent
Kasper et al.

(10) Patent No.: US 10,001,186 B2
(45) Date of Patent: *Jun. 19, 2018

(54) ELECTRIC ACTUATOR FOR S-CAM BRAKE

(71) Applicant: Bendix Spicer Foundation Brake LLC, Elyria, OH (US)

(72) Inventors: Phillip J Kasper, Elyria, OH (US); Christopher H Hutchins, Bay Village, OH (US); Randy J Salvatora, North Olmsted, OH (US); James E Szudy, Parma, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/248,636

(22) Filed: Aug. 26, 2016

(65) Prior Publication Data

US 2018/0058525 A1    Mar. 1, 2018

(51) Int. Cl.

| F16D 51/00 | (2006.01) |
|---|---|
| F16D 65/22 | (2006.01) |
| F16D 51/28 | (2006.01) |
| F16D 121/24 | (2012.01) |
| F16D 125/30 | (2012.01) |
| F16D 125/52 | (2012.01) |

(52) U.S. Cl.
CPC ............. *F16D 65/22* (2013.01); *F16D 51/28* (2013.01); *F16D 2121/24* (2013.01); *F16D 2125/30* (2013.01); *F16D 2125/52* (2013.01)

(58) Field of Classification Search
CPC ...... F16D 51/28; F16D 65/22; F16D 2121/24; F16D 2125/30; F16D 2125/52

USPC ... 188/332, 74, 79.51, 79.56, 156–159, 162, 188/325, 328

See application file for complete search history.

(56) References Cited

U.S. PATENT DOCUMENTS

| 3,420,347 A | 1/1969 | Bales |
|---|---|---|
| 5,157,329 A | 10/1992 | Brauer |
| 5,219,049 A | 6/1993 | Unterborn |
| 5,320,198 A | 6/1994 | Hoyt |
| 5,339,069 A | 8/1994 | Penner |

(Continued)

OTHER PUBLICATIONS

Burch, Melody, "Office Action Communication on U.S. Appl. No. 15/164,983," Paper, dated Oct. 3, 2017, 19 pages, United States Patent and Trademark Office, Alexandria Virginia, U.S.A.

*Primary Examiner* — Pamela Rodriguez
(74) *Attorney, Agent, or Firm* — Cheryl L. Greenly; Brian E. Kondas; Eugene E. Clair (57) ABSTRACT

A drum brake assembly includes a brake spider having a central aperture configured to receive an axle extending therethrough and first and second brake shoes. Each of the first and second brakes shoes has a first end pivotally coupled to the brake spider. First and second cam followers are disposed at corresponding second ends of the first and second brake shoes. A camshaft has a shaft extending through a camshaft aperture in the brake spider and disposed along a rotational axis and a cam disposed at a first end of the shaft and in engagement with the first and second cam followers. An electric motor has an output shaft coupled to the camshaft. A controller is configured to drive the electric motor to cause rotation of the camshaft and move the first and second brake shoes between positions of engagement and disengagement with an associated braking surface.

6 Claims, 7 Drawing Sheets

(56) References Cited

U.S. PATENT DOCUMENTS

| | | |
|---|---|---|
| 5,913,390 A | 6/1999 | Hostetler |
| 6,907,965 B2 | 6/2005 | Peter |
| 7,317,981 B2 | 1/2008 | Evans |
| 8,322,798 B2 * | 12/2012 | Kondo .................. B60T 13/741 |
| | | 188/265 |
| 8,887,878 B2 | 11/2014 | Flodin |
| 8,919,224 B1 | 12/2014 | Bennett |
| 9,175,737 B2 | 11/2015 | Bach |
| 2002/0195298 A1 | 12/2002 | Borugian |
| 2008/0048596 A1 | 2/2008 | Konishi |
| 2009/0145673 A1 | 6/2009 | Soliman |
| 2009/0260929 A1 | 10/2009 | Boyle |
| 2012/0153753 A1 | 6/2012 | Hanlon |
| 2014/0020997 A1 | 1/2014 | Bach |
| 2015/0152928 A1 | 6/2015 | Yoon |
| 2015/0360671 A1 | 12/2015 | Williams |

\* cited by examiner

ELECTRIC ACTUATOR FOR S-CAM BRAKE

BACKGROUND OF THE INVENTION

Field of Invention

This invention relates to vehicle brakes. In particular, the invention relates to a drum brake assembly in which the position of a cam used to moving brake shoes between positions of engagement and disengagement with a brake drum is electronically controlled.

Background

In a conventional drum brake, a drum rotates with a wheel or wheels proximate to one end of an axle. The drum defines a radially inner braking surface. A brake spider is disposed about the axle and a pair of brake shoes is pivotally mounted at one end to the brake spider. The opposite end of each brake shoe is engaged by an actuating member such as a cam to move the brake shoes between positions of engagement and disengagement with the braking surface of the brake drum. Rotation of the cam is controlled by a pneumatic brake actuator acting through a slack adjuster mounted on one end of a camshaft supporting the cam. The slack adjuster translates linear motion of a pushrod extending from the brake actuator into rotational movement of the camshaft to control the position of the camshaft and cam and to adjust the position to account for brake lining wear.

The use of pneumatic actuators to control cam position has several disadvantages. The actuator is relatively large and adds significant weight to the vehicle. Further, the system of valves and conduits used to control delivery of fluid pressure to the actuator consumes additional space on the vehicle and adds additional weight. The actuation system also fails to convey information regarding the state of the brake. As a result, periodic inspection of the brake is required resulting in lost productivity.

The inventor herein has recognized a need for a drum brake assembly that will reduce one or more of the above-identified deficiencies and/or provide improved performance.

BRIEF SUMMARY OF THE INVENTION

This invention relates to a drum brake assembly, an actuator for a drum brake, and a method for controlling a drum brake.

A drum brake assembly in accordance with one embodiment of the invention includes a brake spider having a central aperture configured to receive an axle extending therethrough and first and second brake shoes. Each of the first and second brakes shoes has a first end pivotally coupled to the brake spider. The assembly further includes a first cam follower disposed at a second end of the first brake shoe and a second cam follower disposed at a second end of the second brake shoe. The assembly further includes a camshaft having a shaft extending through a camshaft aperture in the brake spider and disposed along a rotational axis and a cam disposed at a first end of the shaft and in engagement with the first and second cam followers. The assembly further includes an electric motor having an output shaft coupled to the camshaft and a controller configured to drive the electric motor to cause rotation of the camshaft and move the first and second brake shoes between positions of engagement and disengagement with an associated braking surface.

An actuator for a drum brake in accordance with one embodiment of the invention includes an electric motor having an output shaft configured for coupling to a camshaft of the drum brake. The actuator further includes a controller configured to drive the electric motor to cause rotation of the camshaft and move at least one brake shoe between positions of engagement and disengagement with an associated braking surface. The controller is configured to receive a command indicative of a desired brake force. The controller is further configured to transmit a control signal to the electric motor, the control signal configured to cause the at least one brake shoe to move from the disengagement position to the engagement position. The controller is further configured to monitor a level of current required by the electric motor, determine, responsive to the level of current, whether a brake force applied by the at least one brake shoe corresponds to the desired brake force and, maintain the brake force applied by the at least one brake shoe at the desired brake force.

A method for controlling a drum brake in accordance with one embodiment of the invention includes the step of receiving a command indicative of a desired brake force. The method further includes the step of transmitting a control signal from a controller to an electric motor, the electric motor having an output shaft coupled to a camshaft that is configured to move at least one brake shoe between positions of engagement and disengagement with an associated braking surface. The control signal is configured to cause the at least one brake shoe to move from the disengagement position to the engagement position. The method further includes the steps of monitoring a level of current required by the electric motor, determining, responsive to the level of current, whether a brake force applied by the at least one brake shoe corresponds to the desired brake force and maintaining the brake force applied by the at least one brake shoe at the desired brake force.

A drum brake assembly in accordance with the invention represents an improvement as compared to conventional drum brakes. Through electronic control of the position of the cam, the overall size and weight of the drum brake assembly may be reduced. Further, elements of the fluid control system such as valves and conduits that are used to deliver fluid pressure to the fluid actuator may be eliminated thereby further reducing vehicle weight and providing additional space for other vehicle systems. The use of electronic control further enables ready detection of brake lining wear and other problems that previously required visual inspection and vehicle downtime. The use of electronic control also allows for anti-lock braking without pulsating feedback to the vehicle operator through the brake pedal because the brake pedal and brake are not mechanically coupled.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
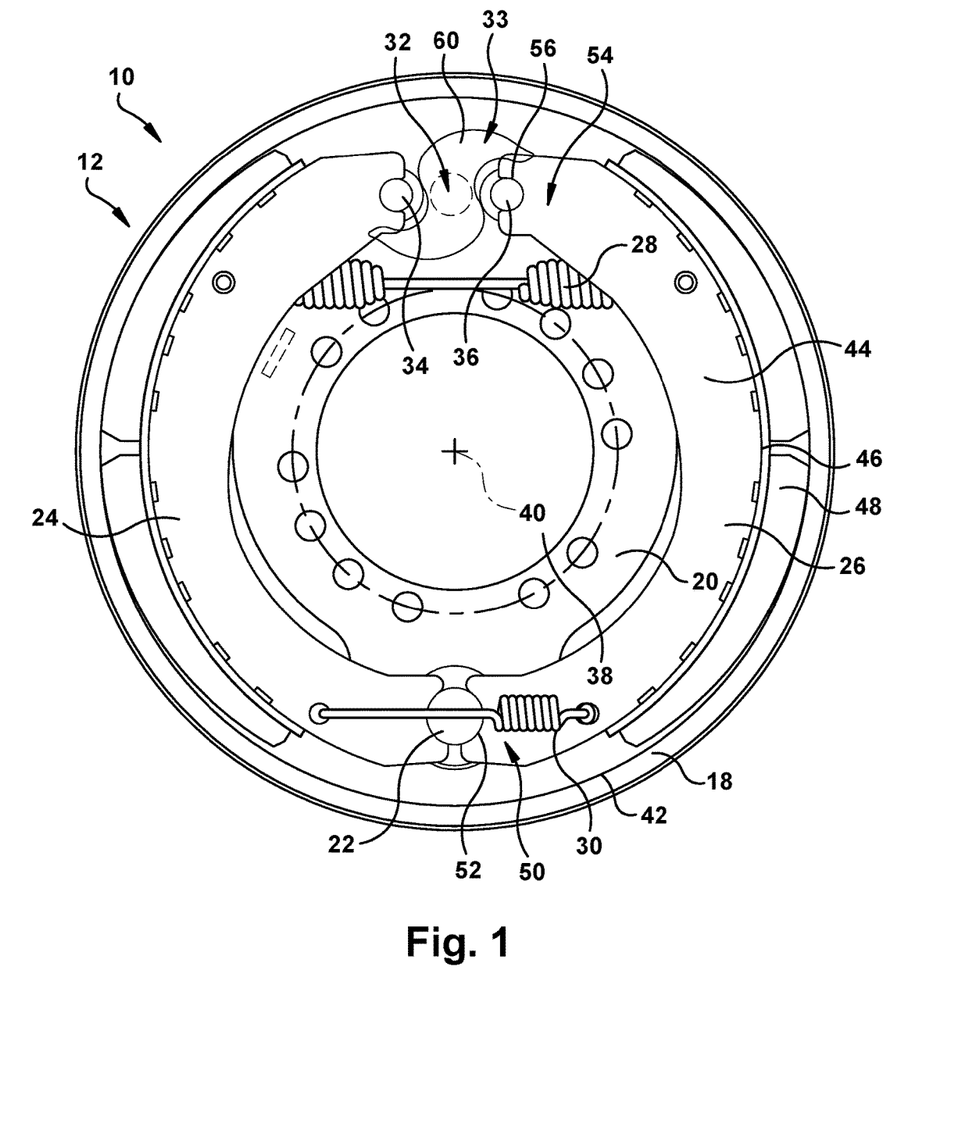
FIG. 1 is a plan view of a portion of a drum brake assembly in accordance with one embodiment of the present teachings.
Figure 2:
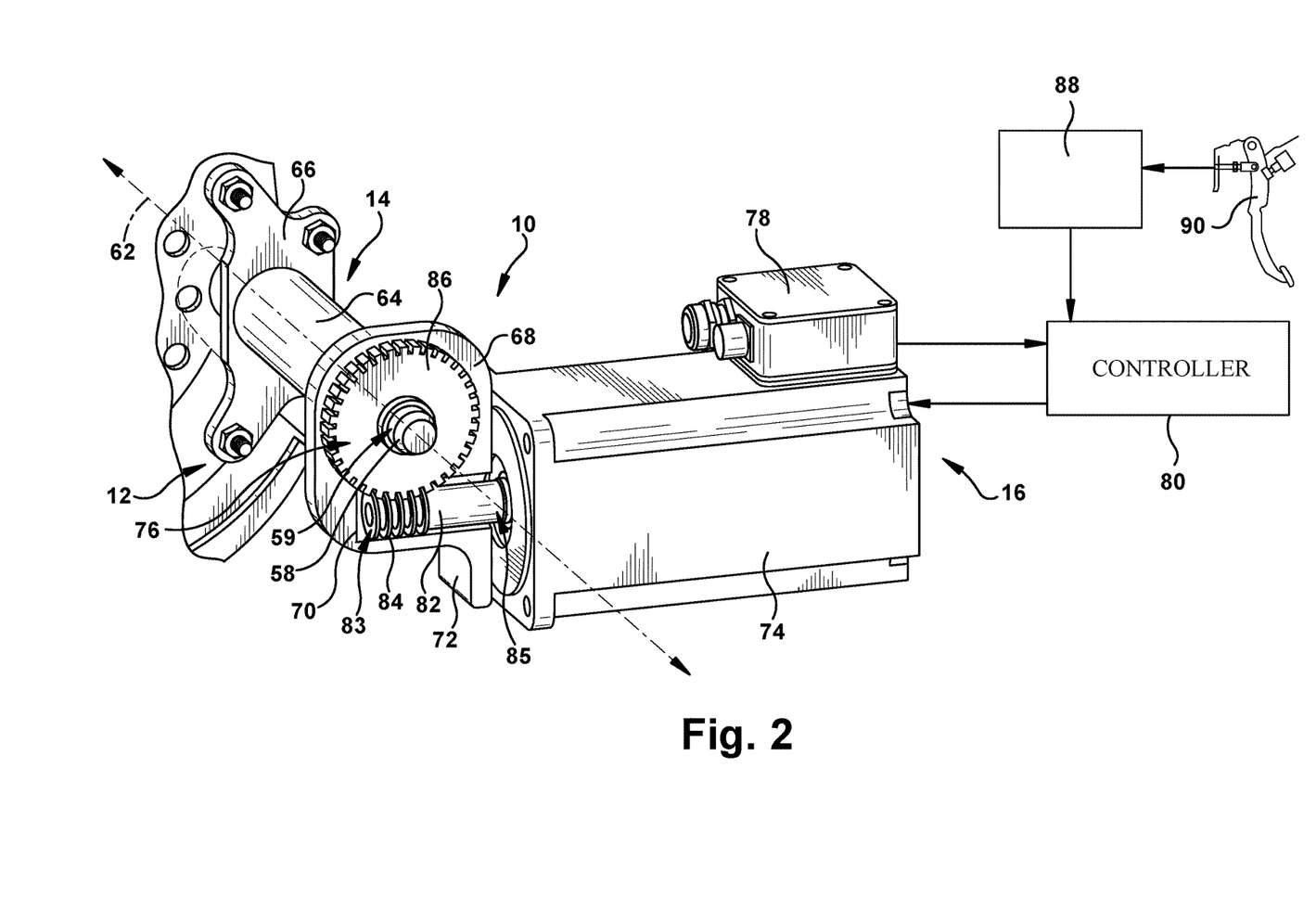
FIG. 2 is a perspective and schematic view of another portion of the drum brake assembly of FIG. 1.

Referring now to the drawings wherein like reference numerals are used to identify identical components in the various views, FIG. 1 illustrates a portion of a drum brake assembly 10 in accordance with one embodiment of the present teachings. Assembly 10 is particularly adapted for use in heavy vehicles. It should be understood, however, that assembly 10 may be used on a wide variety of vehicles and in non-vehicular applications. Assembly 10 includes a brake 12. Referring to FIG. 2, assembly 10 may further include a bracket assembly 14 and a brake actuator 16 in accordance with present teachings.

Referring again to FIG. 1, brake 12 is provided to slow rotation of one or more vehicle wheels. Brake 12 is configured to act against an annular brake drum 18 that rotates with the vehicle wheel or wheels at one end of an axle (not shown). Brake 12 may include a brake spider 20, one or more anchor pins 22, brake shoes 24, 26, return and retaining springs 28, 30, and means, such as camshaft 32 and rollers or cam followers 34, 36, for moving brake shoes 24, 26 between positions of engagement and disengagement with a braking surface of the annular brake drum 18.

Spider 20 is provided to mount the various components of brake 12. Spider 20 defines a central aperture 38 having a center axis 40 which may be coincident with the rotational axis of the vehicle wheel. The aperture 38 is configured to receive a vehicle axle extending therethrough and along axis 40. Spider 20 may further define apertures (not shown) on either side of aperture 38 configured to receive anchor pins 22 and camshaft 32.

Anchor pin 22 is provided to pivotally mount brake shoes 24, 26 to brake spider 20. Anchor pin 22 may comprise a round pin and may be mounted on and extend from brake spider 20. Although only a single anchor pin 22 is shown in the illustrated embodiment, it should be understood that brake shoes 24, 26 may be mounted on separate anchor pins at some distance apart.

Brake shoes 24, 26 are provided for selective engagement with an associated braking surface 42 of drum 18 in order to apply a braking torque to the drum and one or more vehicle wheels. Brake shoes 24, 26 are supported on anchor pin(s) 22 and thereby pivotally coupled to spider 20 at one end. Each brake shoe 24, 26 may include one or more webs 44, a brake table 46, and one or more brake linings 48. Webs 44 support brake table 46. Webs 44 may also provide a connection point for return spring 28 and retaining spring 30. Webs 44 may be made from metals and metal alloys such as steel. Webs 44 are arcuate in shape and extend between opposite ends of brake shoes 24, 26. It should be understood that the number of webs 44 in each brake 24, 26 may vary and each brake shoe 24, 26 may therefore include a plurality of webs 44 that extend generally parallel to one another. Webs 44 may be secured to brake table 46 using welds or other conventional fastening means. Each web 44 may have one end 50 that defines a semicircular recess 52 configured to receive a corresponding anchor pin 22 and an opposite end 54 that defines a semicircular recess 56 configured to engage one of cam followers 34, 36. Brake table 46 is provided to support brake linings 48. Brake linings 48 are provided for frictional engagement with braking surface 42 of drum 18. Linings 48 may be made from conventional friction materials. Brake linings 48 are disposed on brake table 46 and may be secured to brake table 46 using a plurality of rivets or other conventional fasteners including adhesives.

Return spring 28 is provided to bias brake shoes 24, 26 to a position of disengagement from the braking surface 42 of drum 18. Retainer springs 30 are provided to retain brake shoes 24, 26—and particularly webs 44—on anchor pin(s) 22. Springs 28, 30 are conventional in the art. The ends of spring 28 may engage pins (not shown) extending from webs 44 of brakes shoes 24, 26 while the ends of springs 30 extend through corresponding apertures in webs 44 of brake shoes 24, 26.

Camshaft 32, together with rollers 34, 36, provides an actuating assembly or means for moving brake shoes 24, 26 between positions of engagement with and disengagement from the braking surface 42 of the drum 18. Camshaft 32 includes a shaft 58 (best shown FIG. 2) and a cam 60. Referring to FIG. 2, shaft 58 is coupled to actuator 16 at receiving end 59 and supports cam 60 at an actuating end 33. Shaft 58 extends through a camshaft aperture in spider 20 and is disposed about a rotational axis 62. Referring again to FIG. 1, cam 60 comprises a doubled lobed S-cam having a cam surface that is configured to engage cam followers 34, 36.

Cam followers 34, 36 are provided to transfer brake actuation forces from camshaft 32 to brake shoes 24, 26. Cam followers 34, 36 are circular in cross-section and are configured to be received within recesses 56 of webs 44 formed at end 54 of shoes 24, 26. Cam followers 34, 36 engage webs 44 and camshaft 32 and follow the surface of the cam 60 as it rotates thereby causing shoes 24, 26 to pivot about a pivot axis defined at the center of anchor pin 22.

Referring to FIG. 2, bracket assembly 14 is provided to mount brake 12 and brake actuator 16 and position brake 12 and actuator 16 relative to one another. Assembly 14 includes a camshaft tube 64, a brake spider mounting bracket 66, and an actuator mounting bracket 68.

Tube 64 houses shaft 58 of camshaft 32 and protects shaft 58 from external objects and elements. Tube 64 is cylindrical in shape and is configured to receive bushings (not shown) in each longitudinal end that are disposed about shaft 58 and permit rotation of camshaft 32 relative to tube 64. Tube 64 may also be configured to receive grease seals (not shown) in each longitudinal end to prevent loss of lubricating grease from within tube 64.

Brake spider mounting bracket 66 is provided to receive brake spider 20. Bracket 66 is disposed proximate an outboard end of tube 64 and defines a plurality of bores configured to receive fasteners used to couple spider 20 to bracket 66.

Actuator mounting bracket 68 is provided for mounting brake actuator 16. Bracket 68 is disposed proximate an inboard end of tube 64. In the illustrated embodiments, bracket 68 defines an internal cavity 70 configured to house one end of shaft 58 and several components of actuator 16 described below. Bracket 68 further defines a flange 72 to which other components of actuator 16 may be mounted. In should be understood that the configuration of bracket 68 will vary depending on the configuration of actuator 16 and a gear assembly 76.

Brake actuator 16 provides a means for controlling brake 12 and, in particular, a means for rotating the camshaft 32 to move the brake shoes 24, 26 between positions of engagement and disengagement with braking surface 42 in order to apply or release brake 12. In accordance with certain aspects of the present teachings, actuator 16 may also provide information regarding the operation or condition of brake 12. Actuator 16 may include an electric motor 74, a gear assembly 76, a rotary encoder 78 and a controller 80.

Motor 74 is provided to generate a torque to cause rotation of camshaft 32. Motor 74 may comprise an electric motor and may comprise a servo motor. In one embodiment, motor 74 comprises the servo motor offered for sale by Baldor Electric Company under model number BSM100C-4250AA. Motor 74 includes an output shaft 82 configured to rotate about a rotational axis that is perpendicular to a plane containing the rotational axis 62 of shaft 58. The output shaft 82 couples to the gear assembly 76 at a transmitting end 83 and couples to the motor 74 at a motor end 85. The motor 74 may receive power from the primary battery in a vehicle used to supply power to vehicle accessory systems and/or the vehicle powertrain (in an electric or hybrid electric vehicle). Alternatively, or in addition, the motor 74 may receive power from a battery dedicated for use with brake assembly 10 in order to allow operation of motor 74 in the event of a loss of power from the primary vehicle battery.

Gear assembly 76 is provided to increase torque applied to shaft 58. Gear assembly 76 may include a worm 84 that is coupled to, or forms part of, the transmitting end 83 of shaft 82 of motor 74 and is driven by and rotates with shaft 82 about the rotational axis of shaft 82. Gear assembly 76 may further include a worm gear 86 in mesh with worm 84 and supported on the receiving end 59 of shaft 58 for rotation about axis 62. Worm gear 86 may be coupled to shaft 58 using a spline interface or key/keyway interface. Gear assembly 76 may be received within cavity 70 of bracket 68 along with the transmitting end 83 of motor output shaft 82 and the receiving end 59 of shaft 58. In accordance with one aspect of the present disclosure, gear assembly 76 allows brake assembly 10 to function as a parking brake because gear assembly 76 prevents back driving forces from causing reverse rotation of motor output shaft 82. When output shaft 82 is held in place, brake 12 will not back off or further apply brake shoes 24, 26 against braking surface 42.

Rotary encoder 78 provides a means for determining a degree of rotation of the output shaft 82 of the motor 74. Encoder 78 may comprise an absolute or incremental encoder and may comprise a magnetic or optical encoder. As an alternative to encoder 78, a resolver may be used.

Controller 80 is provided to control the output of motor 74 and also to provide information regarding the operation or condition of brake 12. Controller 80 may comprise a programmable microprocessor or microcontroller or may comprise an application specific integrated circuit (ASIC). Controller 80 may include a central processing unit (CPU). Controller 80 may also include an input/output (I/O) interface through which controller 80 may receive a plurality of input signals and transmit a plurality of output signals. The input signals may include signals from a device 88 that translates the movement of a brake pedal 90 to a desired brake pressure, signals from encoder 78 indicative of the position of shaft 82 of motor 74, and signals from wheel speed sensors (not shown) to assist controller 80 in implementing anti-lock and other braking systems. The output signals may include signals used to control motor 74 and signals used to provide an indication of the operation of condition of brake 12 to a vehicle operator. In the illustrated embodiment, controller 80 controls a single motor 74. It should be understood, however, that controller 80 could be configured to control a plurality of motors including, for example, motors used to apply brakes to wheels at either end of a vehicle axle. In accordance with some embodiments, multiple controllers may be employed to independently control motors used to apply different wheel brakes on a vehicle. The use of independent controllers provides redundant braking for additional safety in the event of a failure of a single controller 80 or another component of any individual drum brake assembly 10. Controller 80 may be configured with appropriate programming instructions (i.e. software) to control the output of motor 74 to apply and release brake 12 as commanded as well as to provide information regarding the condition or operation of brake 12.

Figure 3:
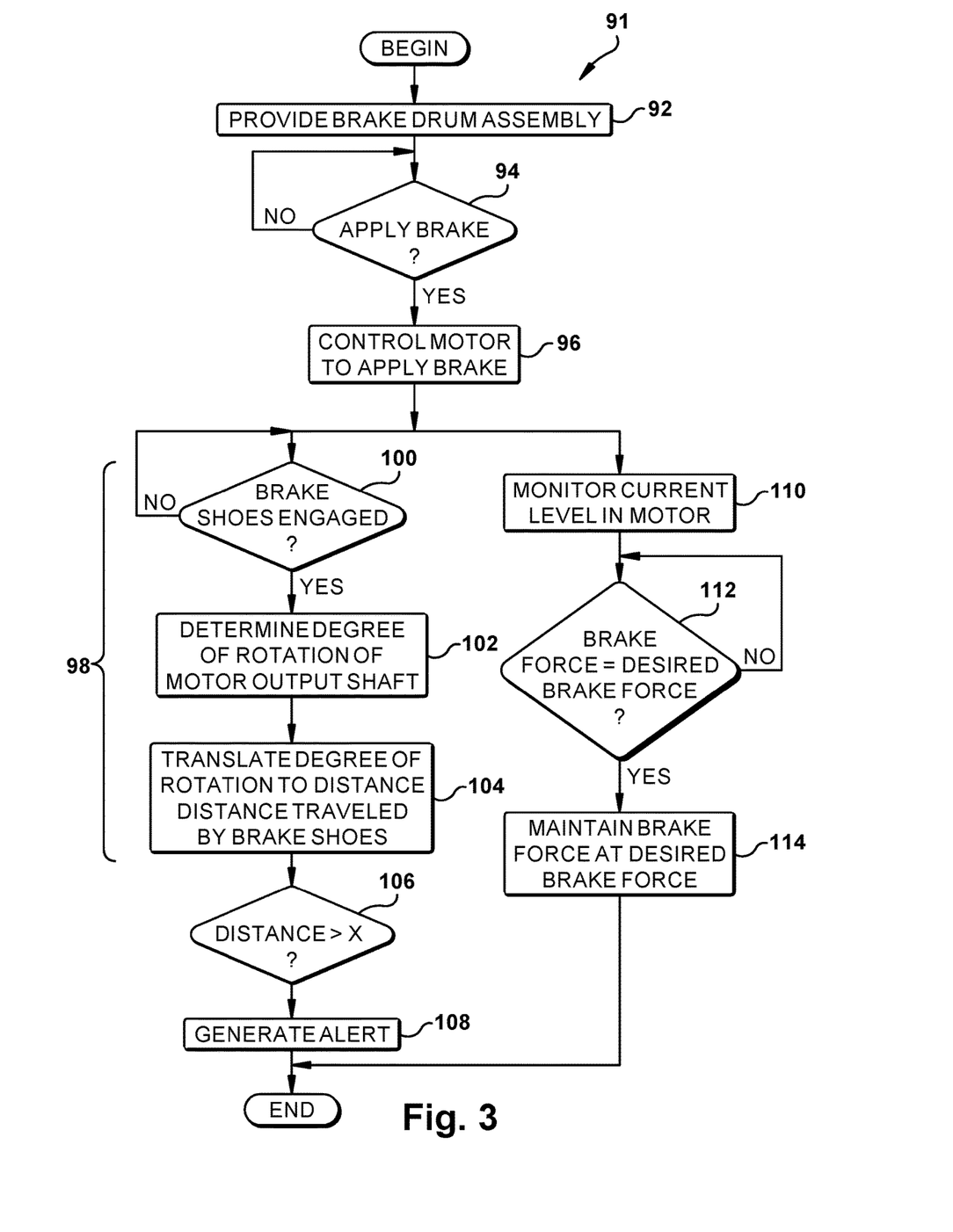
FIG. 3 is a flowchart diagram illustrating steps in a method for controlling a drum brake in accordance with one embodiment of the present teachings.

Referring now to FIG. 3, in accordance with one embodiment, controller 80 may be configured to perform steps in a method 91 for controlling brake 12. The method 91 may begin with the step 92 of providing a brake drum assembly 10 as described hereinabove. In particular, the assembly 10 may include a brake spider 20 having a central aperture 38 configured to receive an axle extending therethrough. The assembly 10 may also include brake shoes 24, 26 with each of the brake shoes 24, 26 having a first end 50 pivotally coupled to the brake spider 20. The assembly 10 may also include cam followers 34, 36 disposed at second ends 54 of corresponding brake shoes 24, 26 and a camshaft 32. The camshaft 32 may have a shaft 58 extending through a camshaft aperture in the brake spider 20 and disposed along a rotational axis 62 and a cam 60 disposed at a first end of the shaft 58 and in engagement with the cam followers 34, 36. The assembly 10 may further include an electric motor 74 having an output shaft 82 coupled to the camshaft 32 and a controller 80 configured to drive the electric motor 74 to cause rotation of the camshaft 32 and move the brake shoes 34, 36 between positions of engagement and disengagement with an associated braking surface 42.

The method 91 may continue with the step 94 of receiving an input signal that indicates brake 12 should be applied. Input signals commanding application of the brakes may, in certain circumstances, be received even when the vehicle is not in motion. These input signals may be generated by various control modules within the vehicle and may be indicative of a state of the vehicle or a vehicle system. For example, controller 80 may be configured to determine a running clearance for brake 12 before movement of the vehicle. Knowing the running clearance of brake 12 is important because an inaccurate running clearance can lead to inadequate braking (if the running clearance is too large and the brake shoes 24, 26 do not fully engage the braking surface 42) or overheating (if the running clearance is too low and the brake shoes 24, 26 engage the braking surface 42 when braking is not intended to occur). Knowledge of the running clearance also provides information on the degree of wear on brake linings 48 so that the linings 48 can be inspected and replaced as needed without manual inspection of the brake 12 and related downtime for the vehicle. Therefore, various actions indicative of a vehicle start or impending start (e.g., the presence or rotation of a key in an ignition cylinder, actuation of a start pushbutton, or receipt of a remote start signal), may result in transmission of an input signal to controller 80 to cause controller 80 to actuate brake 12. During movement of the vehicle, input signals may comprise commands to apply brake 12 generated by device 88 in response to application of brake pedal 90 and may be indicative of a desired braking force.

In step 96, controller 80 transmits control signals to motor 74 to move the brake shoes 24, 26 from the disengagement position with the braking surface 42 to the engagement position with the braking surface 42. In particular, the control signals control movement of output shaft 82. Movement of output shaft 82 results in corresponding movement of worm 84, worm gear 86, camshaft 32 and cam followers 34, 36, which urges brake shoes 24, 26 outwardly from their disengaged positions to their engaged positions with braking surface 42. When brake 12 is being used as a service brake during operation of the vehicle, the control signals generated by controller 80 are configured to cause a sufficient degree of rotation of camshaft 32 to cause movement of the brake shoes 24, 26 over a distance corresponding to the desired/commanded braking force. Controller 80 may therefore be configured to determine the degree of rotation of output shaft 82 necessary to produce the desired movement in brake shoes 24, 26 to apply the desired/commanded braking force.

In response to the desired/commanded braking force, the controller 80 may set the motor 74 in a first mode, which is a high speed mode. The first mode is used when low reaction torque is calculated by the controller 80 and an initial brake application is requested via the driver application of the brake pedal 90. In a high speed mode, the running clearance between the brake shoes 24, 26 and the braking surface 42 is more quickly reduced, which allows for a shorter vehicle stopping distance. In response to the calculation of a high reaction torque by the controller 80, the motor 74 may be set in second mode, a low or zero speed mode, in order to continually apply the brake shoes 24, 26 against the braking surface 42 in response to the desired/commanded braking force.

As referenced above, controller 80 may be configured to determine a running clearance for brake 12 before movement of the vehicle. When performing this operation, the method 91 may continue with the step 98 of determining a distance travelled by at least one of brake shoes 24, 26 from its disengaged position to its engaged position with braking surface 42. Step 98 may include several substeps. In substep 100 controller determines when the brake shoe 24, 26 reaches a position of engagement with braking surface 42. Upon engagement, there will be an increase in the torque output required by motor 74 resulting from the resistance provided by surface 42 to further outward movement of brakes shoes 24, 26. The increase in required torque will manifest itself in a proportional increase in current required by motor 74. Controller 80 may be configured to detect the increase in current as an indication that brake shoes 24, 26 have engaged braking surface 42. In substep 102, controller determines the degree of rotation of output shaft 82 of motor 74 that occurred as brake shoes 24, 26 moved from their disengaged positions to their engaged positions with braking surface 42. Controller 80 may make this determination by recording the output of encoder 76 when controller 80 detects that brakes shoes 24, 26 have reached the engaged position.

Depending on the nature of the encoder 76 or other position detection device employed, the output may be indicative of the absolute degree of rotation of motor output shaft 74 or controller 80 may need to compare the output to a previously stored value and compute the degree of rotation. In substep 104, controller 80 translates the degree of rotation of output shaft 82 into a distance travelled by at least one of brakes 24, 26. Because there is a known mechanical relationship between output shaft 82, worm 84, worm gear 86, camshaft 32, cam followers 34, 36 and brake shoes 24, 26, the degree of rotation of output shaft 82 is indicative of the distance travelled by brake shoes 24, 26. Controller 80 may translate the degree of rotation of output shaft 82 to a distance travelled by brake shoes 24, 26 by, for example, computing the distance from a formula programmed in controller 80 or by using a look-up table of other data structure correlating degrees of rotation of output shaft 82 and distances travelled by brake shoes 24, 26.

In some embodiments, the method 91 may continue with additional steps intended to determine whether the running clearance is indicative of a condition where maintenance of brake 12 is required. A relatively large running distance may be indicative of excessive wear on brake linings 48 and indicate a need to replace linings 48. Accordingly in steps 106, 108, controller 80 may compare the running distance determined above to a predetermined distance and generate a warning signal if the distance meets a predetermined condition relative to the predetermined distance. The predetermined distance may correlate to a level of brake lining wear that requires maintenance or replacement of the linings 48 and may be established through testing. The distance may be stored in an electronic memory of controller 80. If the running distance exceeds the predetermined distance, controller 80 may generate a warning signal in step 108. The warning signal may be configured to generate, for example, an audio or visual alert to the vehicle operator through a microphone or light on a vehicle cabin dashboard or another device.

Alternatively, the running distance may be maintained automatically. If the controller 80 determines that the running distance exceeds a predetermined distance, the controller 80 will send a signal to the actuator 74 to move the gear assembly 76 to decrease the running distance to an acceptable level. The change due to the lining wear would still be stored in memory. Maintaining a constant running distance also prevents over adjusting in an instance of a hot drum and prevents brake drag when the drum cools.

During movement of the vehicle and operation of brake 12 as a service brake, controller 80 may be further configured to ensure that the desired brake force indicated by the input signal in step 94 is applied by brake 12. Therefore, after control signals are generated in step 96 to apply brake 12, controller 80 may be configured in steps 110 and 112 to monitor a level of current required by motor 74 and to determine, responsive to the level of current, whether the brake force or pressure applied by brake shoes 24, 26 corresponds to the desired brake force indicated in the original input signal. As discussed above, the current required by motor 74 is directly proportional to the torque generated by motor 74. Controller 80 may monitor the level of current in motor 74 using signals generated by conventional current sensors within motor 74 or between motor 74 and a battery or other power source. Controller 80 is further configured to compare the current level to a current level corresponding to the desired braking force in order to determine whether the braking force exerted by brake 12 meets a predetermined condition relative to the desired braking force (e.g., is equal to the desired braking force). Controller 80 may obtain the current level for the desired braking force from a formula programmed in controller 80 or by using a look-up table or other data structure correlating brake force and the required current in motor 74. Controller 80 may be further configured, in step 114, to maintain the brake force applied by the first and second brake shoes 24, 26 at the desired brake force. Brake 12 will continue to apply the commanded brake force until controller 80 receives a signal to release brake 12 at which time controller 80 will issue another control signal to motor 74 to reverse rotation of output shaft 82 and, consequently, camshaft 58. The method 91 then ends.

Figure 4:
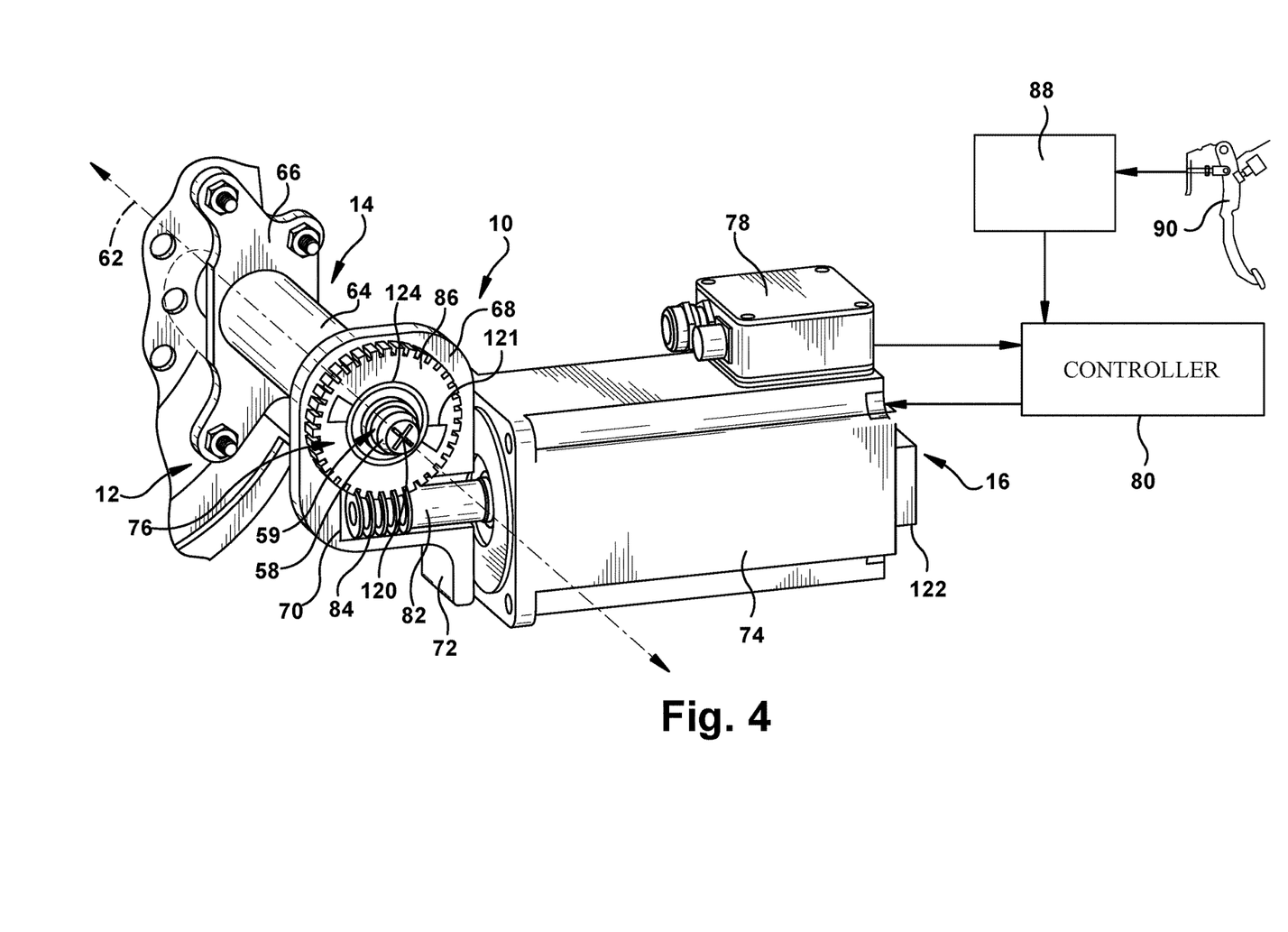
FIG. 4 is a perspective view of a portion of the drum brake assembly according to another example of the invention.

FIG. 4 illustrates a drum brake assembly 10' according to another example of the present invention. The drum brake assembly 10' includes a separate means to manually release an actuated brake. On the gear assembly 76, a key slot 120 is added to the receiving end 59 of the shaft 58. When a key or other device is entered into the key slot 120 and turned, a clutch 121 is released, allowing the shaft 58 to turn independent of any motion of the output shaft 82. Once the clutch 121 is released, the springs 28, 30 on the drum brake (see FIG. 1) position the brake shoes 24, 26 away from the braking surface 42. Another means to release the brake actuation is a manually operable release mechanism 122 integral to the motor 74. With the release mechanism 122, the output shaft 82 can be turned without any action of the motor 74. The output shaft 82 can be turned independently to turn shaft 58 to move the brake 12 to a released position. The release mechanism 122 may include a keyed slot, bolt head or a key and clutch similar to key slot 120 and clutch 121.

In addition, a rotation sensor 124 can be added to the receiving end 59 of shaft 58 to monitor the angular position of the shaft 58. In this manner, the position of the shaft 58 can be correlated to an actuated or released position during the manual release operation. The rotation sensor 124 can be used in conjunction with the manual release of the shaft 58.

Figure 5:
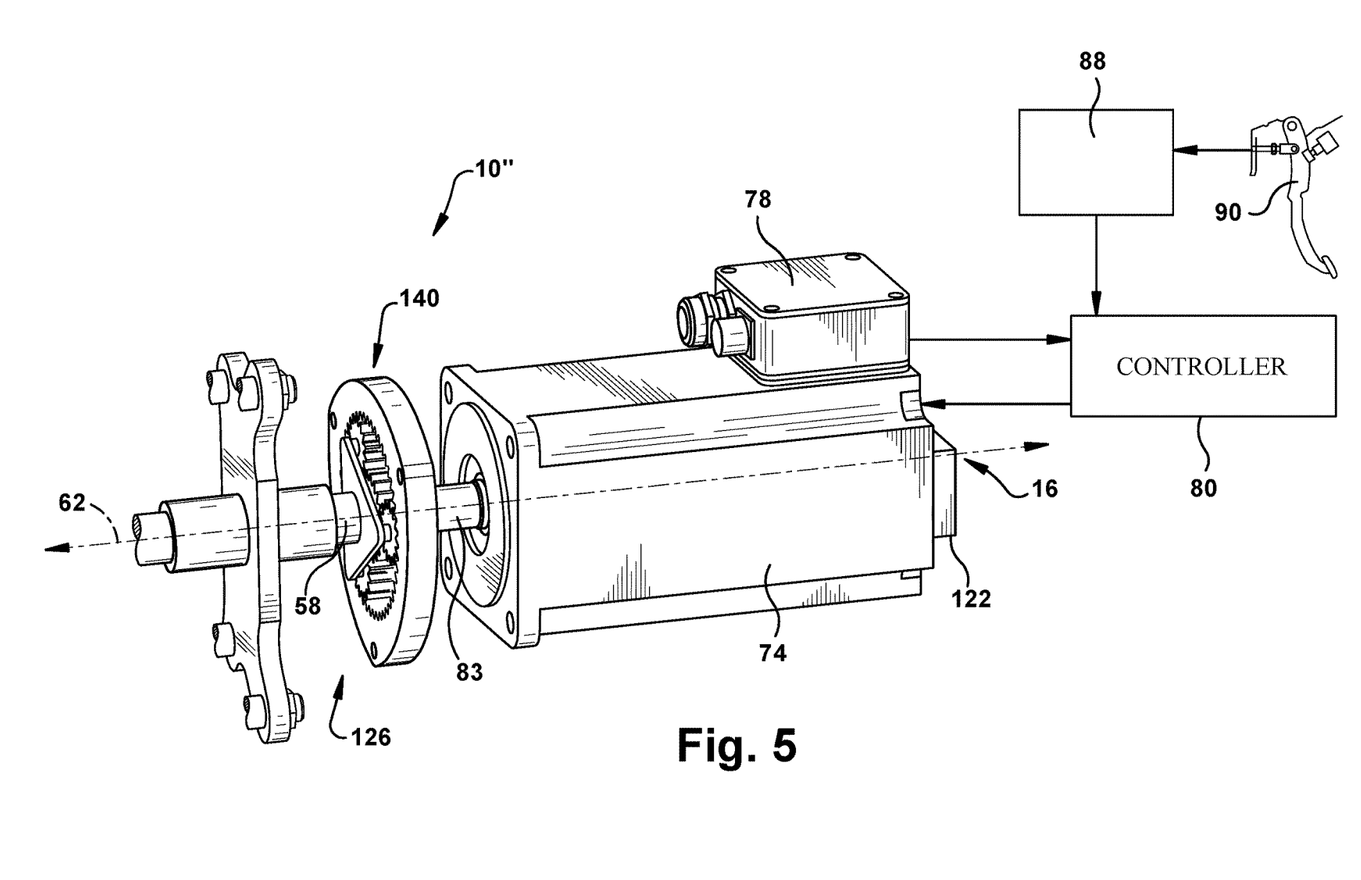
FIG. 5 is a perspective view of a portion of the drum brake assembly according to another example of the invention.

FIG. 5 illustrates another example of a drum brake assembly 10" including a drive mechanism 126 having a planetary gear arrangement 140. A planetary gear arrangement, or Epicyclic gear train, is a gear train where multiple smaller gears rotate and revolve by meshing around a bigger sun gear. A planetary gear ratio may or may not be adjusted during operation depending on torque requirements. The planetary gear arrangement 140 on the transmitting end 83 of output shaft 82 is oriented in a co-axial relationship along the rotational axis 62 of the shaft 58. The output shaft 82 and shaft 58 are coupled together via the planetary gear arrangement 140. The planetary gear arrangement 140 allows for higher torque applications than the worm gear assembly 76 as shown in FIG. 2.

In this example, the drive mechanism 126 is in a first high speed, low torque mode in response to a low reaction torque. The first mode is used when low reaction torque is calculated and an initial brake application is requested via the driver application of the brake pedal 90. In response to a high reaction torque, the drive mechanism 126 is in a second or low, or zero, speed, high torque mode in order to continually apply the brake in response to the braking request.

Figure 6:
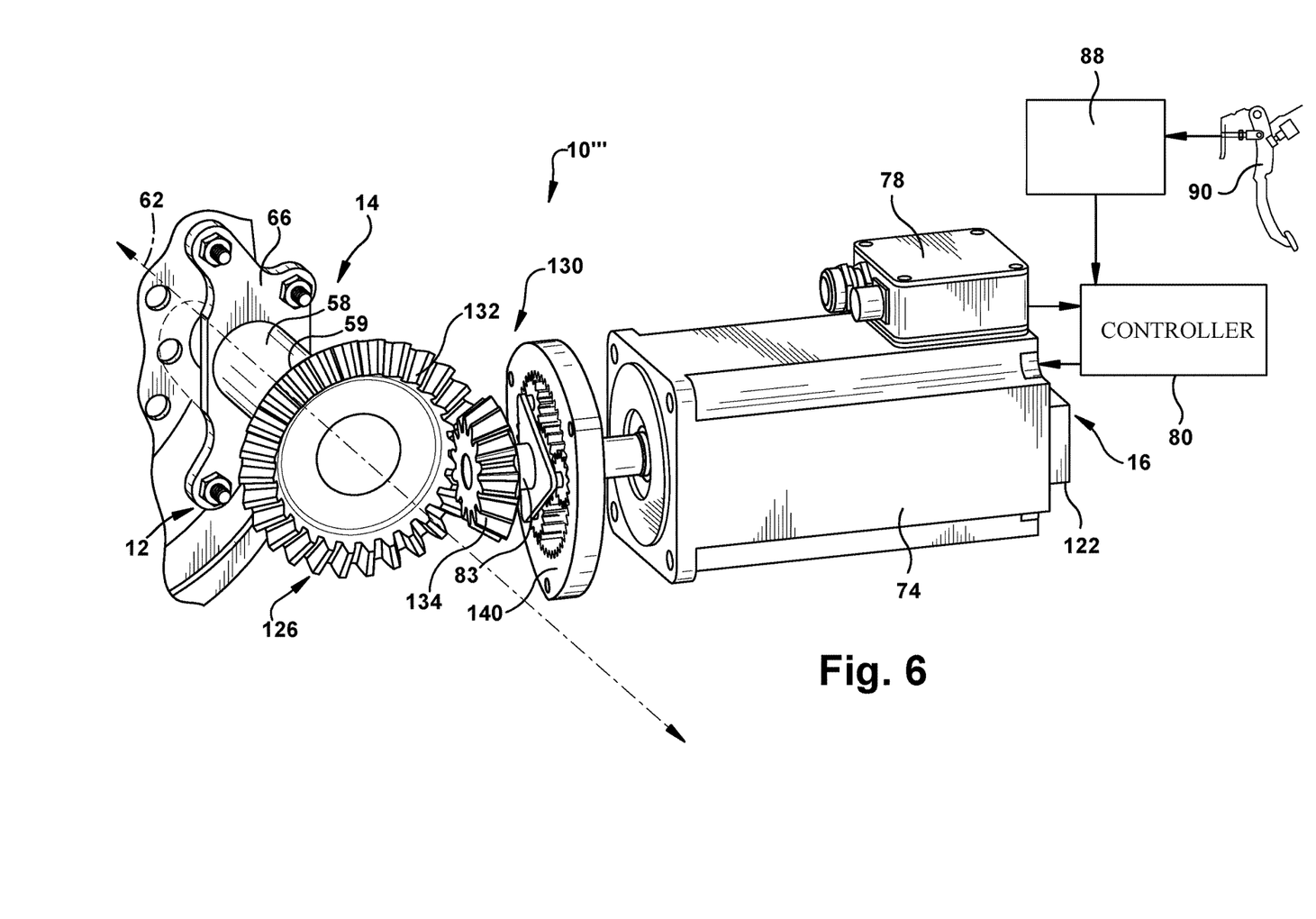
FIG. 6 is a perspective view of a portion of the drum brake assembly according to another example of the invention.

FIG. 6 illustrates another example of a drum brake assembly 10''' with a drive mechanism 126'. The shaft 58 has the receiving end 59 terminating in a first beveled gear 132 and the output shaft 82 transmitting end 83 terminating in a second beveled gear 134. The shaft 58 and output shaft 82 as well as the beveled gears 132, 134 are oriented at a 90 degree angle to one another. The beveled gears 132, 134 are meshed in a one to one ratio and allow for the 90 degree angle relationship between the motor 74 and the brake 12 to be maintained. The planetary gear arrangement 140 as shown in FIG. 5 is located on the output shaft 82 and used for the change in torque as explained previously.

Figure 7:
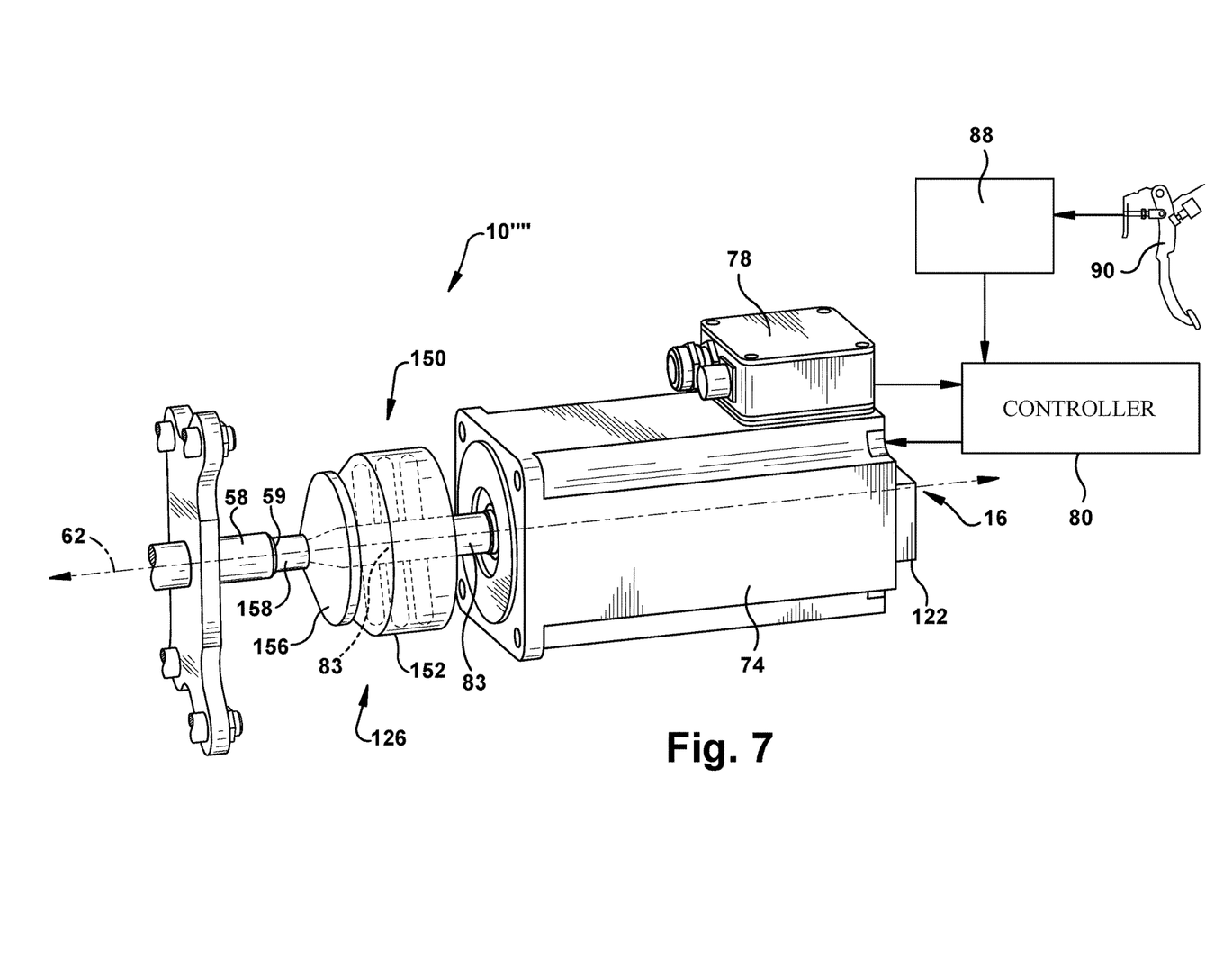
FIG. 7 is a perspective view of a portion of the drum brake assembly according to another example of the invention.

FIG. 7 illustrates yet another example of a drum brake assembly 10'''' with a drive mechanism 126" arranged in an impact drive arrangement 150 according to another example of the invention. Output shaft 82 transmitting end 83 includes a hammer portion 152 and anvil portion 156. The receiving end 59 of shaft 58 includes an interface 158 to receive the anvil portion 156. Shaft 58 and output shaft 82 are coaxial along the rotational axis 62. When the impact gear arrangement 150 is activated by the motor 74, the output shaft 82 rotates the impact drive according to the speed of the motor 74 but the hammer 152 and anvil 156 are not engaged. In a high torque mode, the impact drive increases the torque available at each turn of the motor 74 by engaging the hammer 152 and anvil 156.

The drum brake assemblies 10, 10', 10", 10''' and 10'''' in accordance with the invention represent an improvement as compared to conventional drum brakes. Through electronic control of the position of the cam 60, the overall size and weight of the drum brake assembly 10 may be reduced relative to assemblies containing fluid actuators. Further, elements of the fluid control system such as valves and conduits that are used to deliver fluid pressure to the actuator may be eliminated thereby further reducing vehicle weight and providing additional space for other vehicle systems. Because the assembly uses an electric motor 74 for actuation of the brake 12 rather than a pneumatic actuator, the stroke of the brake 12 is limited only by the rotation of cam 60 and the thermal capacity of the system rather than the length of a pushrod extending from the pneumatic actuator. The assembly further allows for closed loop control of the brake with torque feedback. The assembly can also be tuned to finer control of stability and autonomous braking events. Anti-lock braking systems can apply, monitor and consistently maintain a desired braking torque rather than continually cycling the brakes to find an optimal braking torque as in conventional pneumatically actuated systems. The use of electronic control further enables ready detection of brake lining wear and other problems that previously required visual inspection and vehicle downtime. The use of electronic control also allows for anti-lock braking without pulsating feedback to the vehicle operator through the brake pedal because the brake pedal and brake are not mechanically coupled. Each type of gear assembly 76 and drive mechanism 126, 126', 126" allows for maintaining an adequate running clearance between a brake pad and a brake drum over the life of a brake regardless of the temperature of the brake drum and allow torque adjustment according to the brake force requested. Each drum brake assembly 10, 10", 10''', 10'''' can be adjusted automatically or drum brake assembly 10' can be adjusted manually to minimize dragging brakes and improve stopping distance.

While the invention has been shown and described with reference to one or more particular embodiments thereof, it will be understood by those of skill in the art that various changes and modifications can be made without departing from the spirit and scope of the invention.

What is claimed is:
1. A brake actuator assembly comprising:
   a camshaft associated with a brake assembly, the camshaft having a receiving end and an actuating end, wherein the camshaft is in a first axis;
   an electric motor having an output shaft, the output shaft having a motor end and a transmitting end, wherein the output shaft is in a second axis and the second axis is oriented 90 degrees from the first axis;
   a drive mechanism, wherein the drive mechanism is coupled to the receiving end of the camshaft and the transmitting end of the electric motor, the drive mechanism having a first mode and second mode of operation, and
   a controller configured to drive the electric motor to cause rotation of the camshaft to actuate the brake assembly via the drive mechanism, wherein the drive mechanism is driven in the second mode when the controller is capable of identifying an increase in torque in the electric motor by identifying an increase in current required by the electric motor.

2. The brake actuator assembly as in claim 1, wherein a first mode of operation of the electric motor is a high speed, low force mode and a second mode of operation of the electric motor is a low speed, high force mode.

3. The brake actuator assembly as in claim 2, wherein the controller places the electric motor in the first mode of operation of the electric motor until the increase in torque is identified.

4. The brake actuator assembly of claim 1 wherein the controller is configured to:
receive a command indicative of a desired brake force; and,
transmit a control signal corresponding to the desired brake force to the electric motor, the control signal configured to cause rotation of the camshaft over a distance corresponding to the desired brake force.

5. An actuator for a brake assembly, comprising:
an electric motor having an output shaft configured for coupling to an associated camshaft of the brake assembly wherein the camshaft is in a first axis and the output shaft is in a second axis, the second axis being oriented 90 degrees from the first axis; and,
a controller configured to drive the electric motor to cause rotation of the output shaft, the controller configured to:
receive a command indicative of a desired brake force;
transmit a control signal to the electric motor, the control signal configured to cause the brake assembly to actuate;
monitor a level of current required by the electric motor;
determine, responsive to the level of current, whether a brake force applied corresponds to the desired brake force; and,
maintain the applied brake force applied at the desired brake force.

6. The actuator of claim 5 wherein the controller is further configured, in determining when the brake assembly is actuated, to identify an increase in torque in the electric motor.

* * * * *